June 1, 1937.  R. G. MINER  2,082,176
GAS HEATING UNIT
Filed Nov. 20, 1935    2 Sheets-Sheet 2

INVENTOR
Robert G. Miner
BY Arthur T. Holmes
ATTORNEY

Patented June 1, 1937

2,082,176

UNITED STATES PATENT OFFICE 2,082,176

GAS HEATING UNIT

Robert G. Miner, La Crosse, Wis.

Application November 20, 1935, Serial No. 50,735

3 Claims. (Cl. 126—110)

My invention relates to a gas heating unit, commonly known as a gas space heater.

One of the objects of my invention is to make a gas heating unit of minimum size and self-contained, economical and efficient in manufacture and operation.

Another object of my invention is to bathe the heated surfaces and the interior portions of the casing with currents of cool air so that the casing will not be objectionably hot at any one place.

Another object of my invention is to mix a portion of the air currents passing around the exchanger with currents passed directly through the exchanger so as to cut down the outlet temperatures from the unit.

Another object of my invention is to provide a separate removable compartment within the casing for the mounting of the mixing tubes so that the air pressure influence of the fan will not affect the efficiency of the mixing tubes.

Another object of my invention is the mounting of the mixing tubes and the burner upon the removable compartment so that the mixing tubes and the burner may be removed as a unit.

Another object of my invention is the elimination of insulation as a method of keeping the casing walls cool.

The foregoing and many other specific features of my invention are set forth in the following specification, where I describe what I consider the preferred embodiments of my invention. These are illustrated in the accompanying drawings where—

Figure 1:
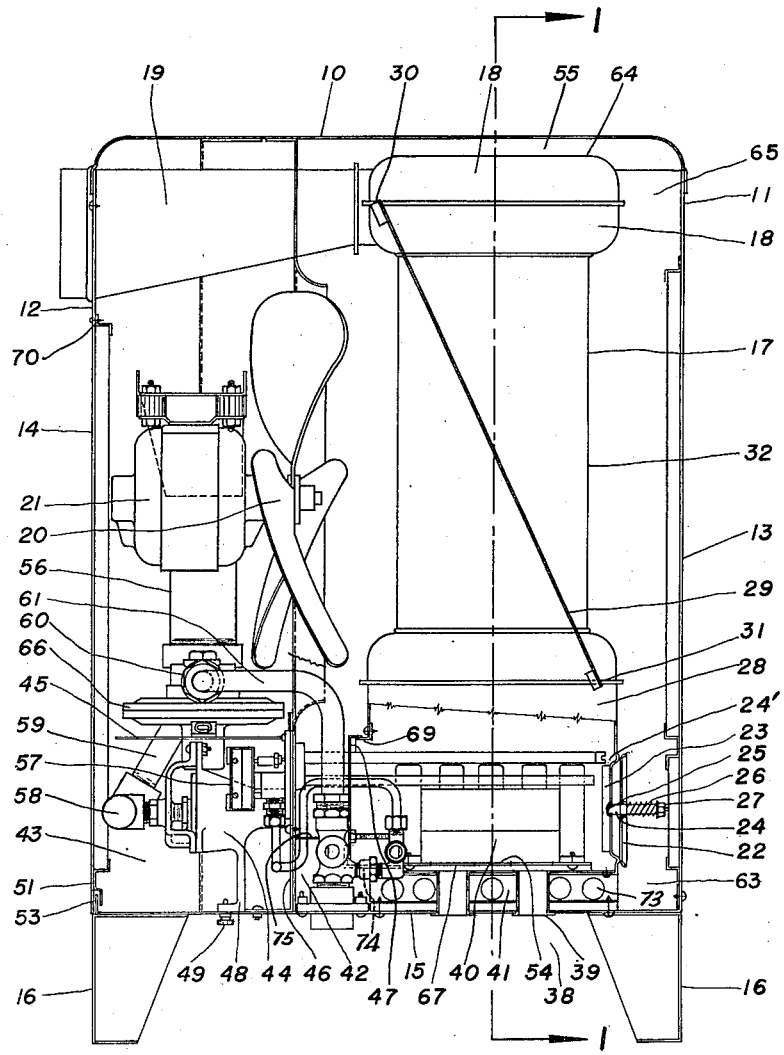
Figure 1 is a vertical elevation of the unit with the side wall removed.

Referring to Figure 1, the numeral 10 represents the top; 11 a front wall; 12 a rear wall; 13 a grille front forming an outlet; 14 a grille rear forming an inlet; 15 a bottom plate; 16 legs supporting the unit; 17 the heat exchanger; 18 the top header thereof; 19 the smoke outlet; 20 the fan producing motion of air from inlet through and around heat exchanger to outlet; 21 the motor operating the fan; 22 an explosion door to prevent injury to exchanger in event of improper ignition; 23 a cross-member stationarily attached to lower header at 24'; 24 a pin attached to flange 23 at 25; 26 a spring, one end bearing against door 22 and other end against nut 27 on the end of pin 24; 28 a lower header and combustion chamber; 29 a baffle on either side of the heat exchanger 17.

Figure 2:
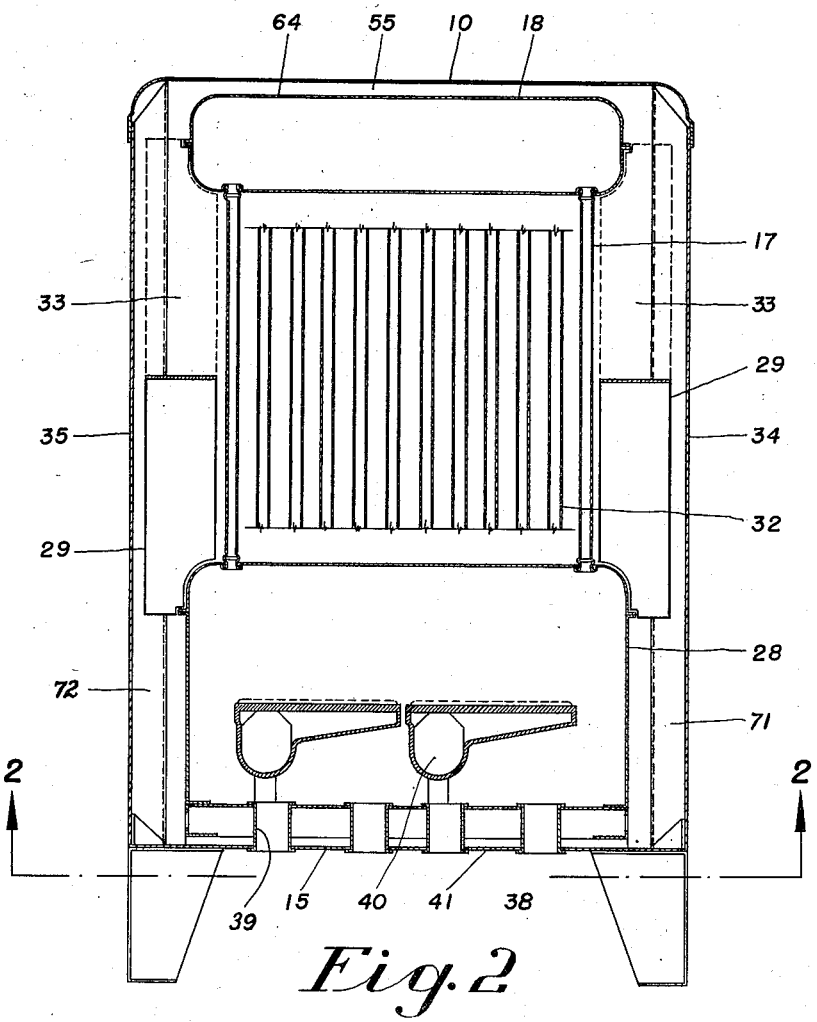
Figure 2 shows a cross section of the unit taken on the line 1—1 of Figure 1.
Figure 3:
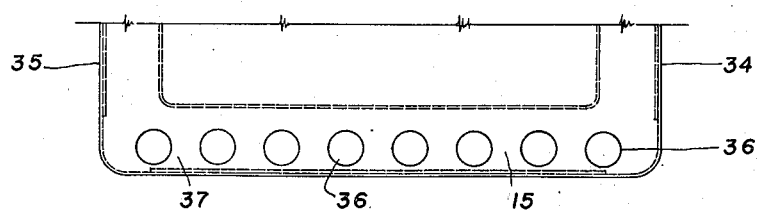
Figure 3 shows a cross sectional view of the bottom casing taken on the line 2—2 of Figure 2.

The baffle 29 is attached to the upper header at 30 and to the lower header at 31. It will be noticed that the vane 29 is diagonal across the heater, being attached to the rear portion of the upper header and the front portion of the lower header, but does not necessarily contact the heat tube 32. The purpose is the directing of the flow of air from the fan 20 through a portion of the space 33 which lies between the exchanger 17 on either side and the side walls 34 and 35. (See Figure 2.)

The purpose of this vane is two-fold—first, to use a portion of the air from the fan 20 to cool the side walls 34 and 35 and the front wall 11; and secondly, to direct a portion of that air to the outlets 36, located in the bottom wall 15. The last air flows through the outlets 36 into the space 38 between the bottom 15 and the floor. The effect of the flow of this air along the bottom of the casing is to prevent it from becoming hot, i. e., warmer than is comfortable to the hand. The flow of air past the exchanger 17 is of sufficient volume to take away a very large proportion of the heat so that the temperature of the exchanger is low and the radiant heat transmitted to the casing so small that the temperature of the upper portion of the casing is only comfortably warm to the hand. The combustion chamber is manifestly of an initially higher temperature, and in order to take away a portion of the heat from the walls of the combustion chamber a current of air is directed against its sides, thus limiting the radiant heat transmitted to the lower portion of the walls 34, 35 and 11; and at the same time the current of air scrubs the interior portions of said walls abstracting heat therefrom so that the said walls remain cool, being only comfortably warm to the hand.

The advantage of this arrangement is the elimination of insulation, which is expensive and of effect only until the heat has penetrated the insulation. This also prevents the burners themselves from getting too hot. Thus, the heat exchanger and the combustion chamber are bathed in a current of cool air.

In order to properly cool the casing, it is not sufficient to have an air space only. There should be a current of air directed through that space, and such a space is designated an "air flow space".

41 designates an air flow space between the burner 40 and the bottom wall 15 and communicates with the air flow passages 42 and 63 and also with the side air flow passages 70, 71 and 72 through round orifices 73 in the bottom portion of the side wall of the combustion chamber 28.

42 designates an air flow space in communication with space 41 and is designed to abstract heat from the rear of the combustion chamber. The air flow space 42 is formed by the partition plates 46 and 47 which extend substantially across the unit between the side walls 34 and 35. Air is directed downwardly through the space 42 by the fan 20 and this current of air then traverses the air flow space 41 toward the front of the combustion chamber. Part of this air is discharged through the outlets 36 in the bottom casing and a portion of the said current is discharged into the communicating air flow space 63 formed by the front wall 28 of the combustion chamber and the front wall 11 of the casing. This current of air flows upward cooling the front of the combustion chamber and the front wall 11, and emits from the unit through the lower portion of the grille 13 where it combines with the current of air directed through the exchanger and modifies the temperature of the last named current of air. This is desirable because otherwise the said current of air would emit at an undesirably high temperature due to its contact with the hottest portion of the heat exchanger. It further tends to produce a current of air emitting from the unit substantially uniform as to temperature.

Another air flow space 55 is formed by the top 10 of the casing and the top 64 of the upper header 18. Air from the fan 20 passes around the smoke exhaust 19 and through the air flow space 55 cooling the top 64 of the header and the top 10 of the casing, and then flows down into a communicating space 65 formed by the front of the header 18 and the front wall 11, and then out through the upper portion of the grille 13. This keeps the upper portion of the casing wall 11 cool.

From the above description it will be observed that the casing of the unit, particularly the top, sides and front, are cooled by directed currents of air and that the whole heat exchanger, combustion chamber and headers are in effect bathed in currents of air, so that the casing is only perceptibly warm to the touch.

A separate compartment 43 is formed by the plate partitions 45 and 46, the bottom 15, the lower rear grille 51, and the lower corners of the side walls 34 and 35.

The compartment 43 houses the mixing tubes 44 and the purpose is to prevent a sub-atmospheric pressure from being formed around the mixing tubes due to the action of the fan.

Mounted on the mixing tube assembly is the manifold 58, the pipe 59 from the manifold to regulator 66, on which is mounted a solenoid valve 56. Both the regulator 66 and the solenoid valve 56 are mounted on the supporting plate 45. Within the compartment 43 is also located the safety thermally actuated switch 57, which is mounted on the plate 46. The regulator 66 is connected to the supply pipe 61 by the detachable union 60. The mixing tubes are supported by legs 48 resting on the bottom plate 15 and anchored thereto by the detachable bolt or set screw 49.

54 represents a false bottom plate acting as a support for the burners 40. The plate 54 has apertures 67 for the secondary air, corresponding to apertures 39. The plate 54 and the burner 40 are attached to the dished plate 47 by the bracket 74.

The plate 47 fits over an opening in the combustion chamber so that the flange 69 fits snugly against the inner side of the dished plate 47. The plate 47 in turn is attached to the plate 46 by the bracket 75.

The rear grille 14 is easily removable, being secured to the upper portion of the rear wall 12 by screws 70 and fits into the clip 53, so that for easy removal of burner and equipment, it is only necessary to loosen the screws 70, lift out the inlet grille, detach the set screw 49 and the union 60, and the entire equipment including the partition 46, the dished plate 47, supporting plate 45, burner, regulator, pilot and mixing tubes slide out like a drawer.

Inasmuch as space is of importance in a small unit as described, the solenoid valve 56 is mounted on the regulator 66.

While I have described the foregoing preferred embodiments of my invention, I contemplate that many changes may be made without departing from the scope or spirit of my invention.

I claim:

1. In a gas heating unit, the combination of a casing having an air inlet and outlet, a heat exchanger comprising upper and lower headers connected by tubes, said tubes being flattened to form horizontal parallel lines of air travel from said inlet to outlet and forming vertical parallel lines of combustion gas travel, said upper header having an outlet for combustion gases and said lower header having a gas burner mounted therein and an inlet for air, said exchanger and casing being arranged to form air flow spaces between said exchanger and said casing, a fan mounted within said casing and directly behind said exchanger and adapted to direct a current of air simultaneously through the first named lines of air travel and through the air flow spaces, and inclined baffles in the air flow spaces between the sides of said heat exchanger and the casing, spaced from the casing and adapted to force a portion of the air from the fan downward along the sides of the lower header, and to direct another portion thereof through such air spaces in contact with the inner surfaces of the side walls of the casing to dissipate heat therefrom.

2. In a gas heating unit, the combination of a casing having an air inlet and outlet, a heat exchanger comprising upper and lower headers connected by tubes and having a gas burner mounted in the lower header, said heat exchanger being mounted in spaced relation to the walls of said casing to provide air flow spaces therearound, fan means mounted within said casing for drawing air through the inlet and advancing it past said tubes to the outlet, an inclined baffle mounted at each side of said heat exchanger and providing passages adjacent the side walls of the casing through which a portion of the air delivered from said fan means flows to dissipate heat from said side walls, said baffles terminating short of the top and bottom walls of the casing whereby another portion of the air is caused to flow around and over the said upper header, while still another portion of the air is directed by said inclined baffles downwardly and around said lower header to cool the same, the various air flows so established meeting and mixing with the major flow of air advanced through the heat exchanger in the space adjacent the outlet of the casing.

3. In a gas heating unit, the combination of a casing having an air inlet and outlet, a heat exchanger comprising upper and lower headers connected by tubes and having a gas burner mounted in the lower header, said heat exchanger being mounted in spaced relation to the walls of said casing to provide air flow spaces therearound, a fan mounted within said casing for drawing air through the inlet and advancing it past said tubes to the outlet, a pair of downwardly and outwardly inclined baffles mounted on the ends of said headers and extending therebetween in close proximity to the said tubes but spaced from the side walls of the casing, said baffles providing air flow passages adjacent the side walls of the casing through which a portion of the air delivered from said fan flows to dissipate heat from said side walls, said inclined baffles terminating short of the bottom wall of the casing whereby another portion of air is caused to flow downwardly around the lower header to cool the same, the various air flows around the heat exchanger meeting and mixing with the air passing therethrough before emerging from said outlet of the unit.

ROBERT G. MINER.